Figure 1:
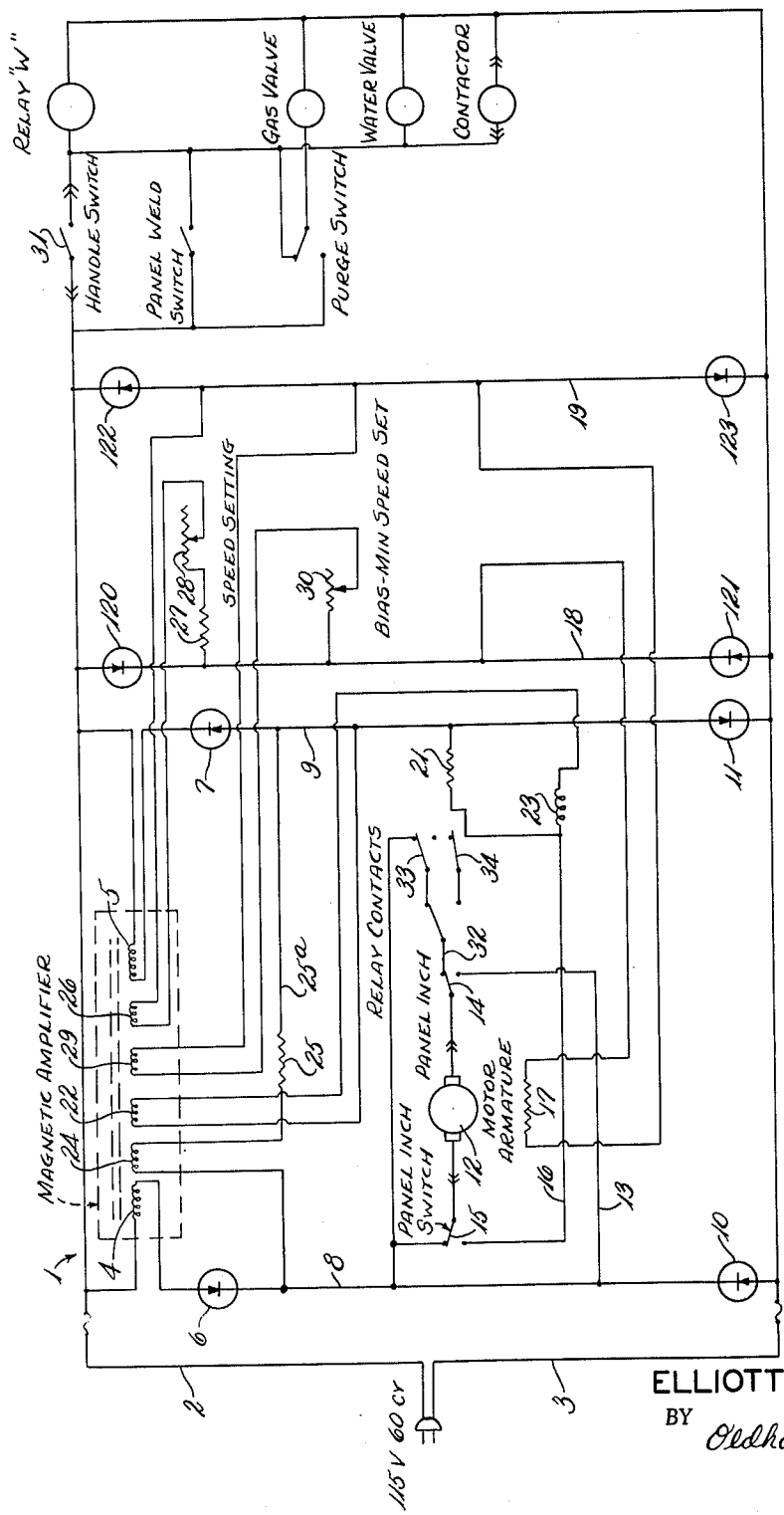

United States Patent Office 3,218,539
Patented Nov. 16, 1965

3,218,539
CONTROL FOR ELECTRODE WIRE FEED
Elliott C. Cornell, Jr., Brecksville, Ohio, assignor to The Auto Arc-Weld Manufacturing Company, Cleveland, Ohio, a corporation of Ohio
Filed Aug. 18, 1961, Ser. No. 132,400
3 Claims. (Cl. 318—317)

The present invention relates to controls for electrode wire feed, and especially to a control or control system for the independent feeding of the weld electrode not dependent upon the weld current or voltage.

Controls of the type of the present invention are usually used with welding systems having independent welding power supply and where a constant potential weld generator is used. Particularly, the present invention relates to two well known welding processes wherein very steady welding wire feed rates are required for the most desirable welding action. Thus in one process a small diameter welding wire, such as about .020 inch to about .035 inch is welded with low arc voltages, such as about 15 to 18 volts. In such welding action, the weld arc is sustained by the electrode wire tip intermittently dipping into the weld puddle at rates of about 100 to 200 strikes, or hits per second. This requires a very steady wire feed, as previously indicated, in order to maintain the weld arc. Such type of an arc has some advantages in that it has low spatter and relatively low heat so that sheet metal articles can be welded without the usual large heat distortion, or expensive cleaning action being required before painting.

A second process to which the controls of the invention are applicable is where larger electrode wires, such as about 3/32 of an inch to about 1/8 of an inch diameter, are used and where slower electrode wire feed speeds are used for maintaining weld action. As the welding current is proportional to the wire feed speed with constant potential welders, the wire feed must be steady at a low speed to maintain a steady, low welding current. Wire feed speed variations cause large weld current variations that result in uneven deposits of the weld material and also produce excessive weld spatter. This welding action can be used to advantage on heavy weldments using, for example, 3/8 inch or 1/2 inch plates, or the like.

Some efforts have been made heretofore to provide electronic controls or other controls in order to provide the steady wire feed rate desired. These controls have not been of a simple, rugged construction, and they have involved, in some instances, relatively complex circuits with consequent high costs.

In various welding actions, such as those to which the control system of the invention relates, usually the electrode wire is fed to the weld head through some type of a control tube or cable. As the wire supplied to this cable may have kinks therein, or there may be excessive cable coiling forces residing in the electrode wire when it is forced through a control cable or nozzle, resistance to passage of the electrode wire through the cable may vary widely such as from a normal force of 10 to 15 lbs. up to a higher force of 25 or 30 lbs. and with known controls appreciable variations in the electrode feed rate would frequently be produced by these variations in the resistance force to feed of the electrode wire.

It is the general object of the present invention to provide a novel and improved control for the feed of electrode wires, and where the control is characterized by the use of a magnetic amplifier reactor as the main speed control component.

Another object of the invention is to use a magnetic amplifier reactor in circuits of the class described, and where the magnetic amplifier reactor has at least a pair of control coils provided therein as well as a pair of main current carrying coils therein and with relatively sensitive rectifier means connected in circuit with the reactor coils for rectifying an A.C. power supply to use it for D.C. power supply to an electrode wire feed motor.

Another object of the invention is to use a control circuit of the type described and where one control coil in the magnetic amplifier reactor is in opposition to the main or output coils of the reactor and is connected in the circuit to have a voltage proportional to or equal to that applied across the motor armature to produce a decrease in the output of the reactor upon application of increased voltage across the motor armature, and to have a second control coil connected in the motor armature circuit to increase the reactor output upon increases in the motor armature current.

Another object of the invention is to provide a control in the motor armature circuit of a welding system of the type described and where the motor armature circuit, as one portion thereof, has a parallel circuit formed between a low resistance and a series connection of one of the magnetic amplifier reactor control coils and a choke coil whereby increased armature current will cause an increase in the output of the reactor. However, the choke coil will serve to delay rapid changes in armature current flow in the control winding portion of the circuit and thereby permit an increase in the output of the reactor and will smooth out current fluctuations to maintain a substantially constant motor speed with variations in the load applied thereto.

A further object of the invention is to use additional control coils in a magnetic amplifier reactor provided in the control system of the invention whereby the speed of the electrode feed motor can be initially set to a desired range, and where adjustments in the apparatus can be provided to compensate for minor manufacturing variations in the values of the various elements in the control circuit so as to set it at a desired bias or speed control adjustment.

A further object of the invention is to provide a special circuit means in association with the armature circuit of the electrode wire feed motor to prevent any serious oscillation or hunting action in the motor speed with changes in load applied to the electrode feed wire, and to maintain constant speed at both low and high speed conditions.

The foregoing and other objects and advantages of the present invention will be made more apparent as the specification proceeds.

Figure 2:
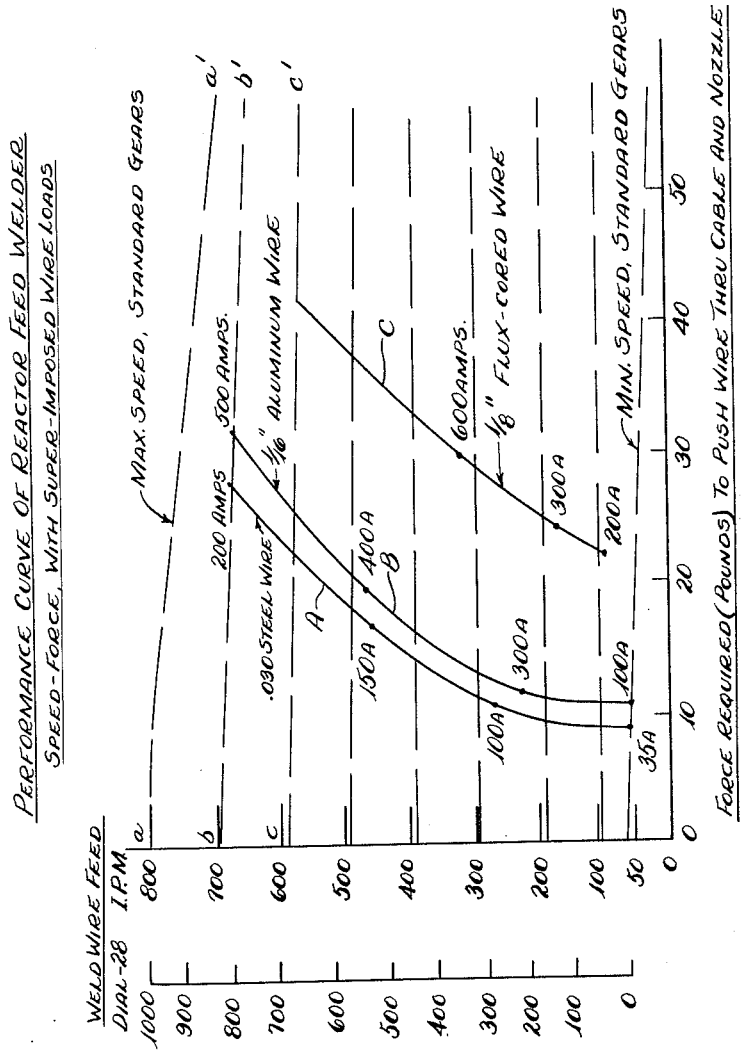

For a better understanding of the present invention, reference now should be had to the accompanying drawings, wherein:

FIG. 1 is a diagrammatic wiring diagram of the control system of the invention; and FIG. 2 is a typical graph showing the electrode wire feed speed in relation to the force required for feeding the electrode wire and other associated data as shown thereon.

When referring to corresponding members shown in the drawings, and referred to in the specification, corresponding numerals are used to facilitate comparison therebetween.

With reference to the details of the structure shown in the drawings, the control, or control system or apparatus of the invention is indicated as a whole by the numeral 1. In the control, suitable leads 2 and 3 are provided for connection to a conventional 115 volt 60 cycle source of A.C. power. It is an important feature of the present invention that a magnetic amplifier reactor is used in association with suitable rectification means for supplying D.C. current and voltage for operation of the electrode wire feed motor. Thus the primary reactor coils 4 and 5 are shown and which connects through suitable sensitive rectifiers, such as silicone diodes 6 and 7, connected so as to conduct opposite pulses of the A.C. power supply therethrough, as indicated in the drawing, to power supply leads 8 and 9, respectively. These power leads 8 and 9 connect back to the opposite A.C. power supply lead 3 through similar silicone diodes 10 and 11, respectively, connected for current conduction in the direction indicated. The armature 12 of an electric motor provided for driving the electrode wire (not shown) to the weld at a substantially constant rate of speed receives current by a lead 13 that connects to the D.C. power supply lead 8. For motor operation, any conventional control means may be provided, and in the circuits shown, seriesed relay contacts 32, 33, and 34 of relay W close to drive the wire feed motor in the forward direction and for reverse feed switch 14 would be closed to the lead 13 and a switch 15 would be closed to a lead 16 in the circuit for current flow through the motor armature. The motor armature circuit is completely by means to be described hereinafter in more detail. This motor for electrode wire feed is separately excited through a motor field coil 17 that is connected between a second pair of D.C. power supply leads 18 and 19 provided in the control circuit. Rectifier diodes, like the diodes 6 and 7, are provided at 120, 121, 122 and 123 and connects the leads 18 and 19 to the power supply leads 2 and 3 in the manner indicated for D.C. current flow therethrough for motor field energization and for other actions, as hereinafter described.

It is an important feature of the invention that the armature circuit is completed and current flow therethrough is controlled by means of a parallel circuit formed between a relatively low value resistance 21, which may have a resistance, such as 1½ ohms, and a series circuit formed between a control coil 22 for the magnetic amplifier reactor and a choke coil 23. It has been found by using a control coil 22 that is wound in such a manner as to augment the output of the reactor, and where this control coil 22 has 120 turns in it and is connected to a choke coil 23 that has, for example, an inductance of 10 henries, that very effective control action can be provided by this control coil so that as the motor armature current increases, the control coil 22 augments the output of the reactor coils 4 and 5 to provide increased voltage. The increased voltage produced in the reactor enables the motor armature to operate under increased load at substantially the same speed as under other load conditions and maintains a uniform feed rate for the electrode even under increased resistance conditions. Increasing the resistance 21 drives more current through the coils 22 and 23 to increase the reactor volts more rapidly on armature current increase.

A further important control feature in the apparatus or control system of the invention is that a second control coil 24 for the reactor is connected so as to oppose the output of the reactor coils 4 and 5 and such control coil 24 is connected through a relatively high resistance 25 by a lead 25a that connects across the output of the reactor coils 4 and 5 and either has the motor voltage, or voltage proportional thereto, applied on the control coil 24 at all times. Thus on increased voltage output of the reactor, the action of the control coil 24 is such as to reduce the output of the reactor and this maintains a substantially steady voltage output from these main reactor coils 4 and 5 to again contribute to the provision of a uniform speed for the electrode wire feed motor. Variation in the resistance 25 may be provided to aid in obtaining the desired amount of voltage current feedback action required to maintain uniform feed motor speed.

The feedback action provided by the control coil 22 has a portion of the armature current forced therethrough by even the small value resistance 21 connected in parallel thereto. When efforts were made to operate the circuit of the invention without the choke coil 23 therein, it was found that relatively rapid oscillations would occur in the motor speed over the usual range of operating speeds required in motors of this type for weld action. It was found as an important feature of the invention that this oscillation in motor speeds could be reduced to negligible values by adding an inductance such as the choke coil 23 in the circuit to smooth out the current flow through the control coil 22. By providing an inductance of about 10 henries in this choke coil, the motor speed oscillation was smoothed out and uniform speeds for operating purposes were obtained in the circuit described. Use of the resistance 21 provides a control to regulate the amount of armature current that passes through the choke and control coils.

It further has been found in use of the control 1 of the invention, that the voltage feedback action provided by the control coil 24 in its associated circuit provided substantially the same armature current feedback effect at both high and low speeds and thus the combined action of both voltage feedback and armature feedback aided in obtaining a feed motor uniform speed condition even though the loads applied thereto would vary widely.

A further control coil 26 is provided in the reactor used in the control circuit, and such control coil in this embodiment of the invention has 300 turns provided therein. The control coil 26 is connected through a fixed resistance 27 and a potentiometer 28 to the power supply leads 18 and 19 so that by adjustment of the potentiometer 28, the output of the main reactor coils 4 and 5 can be varied to set motor speed at a desired operating range. Normally this control coil 26 is wound so as to augment the output of the reactor coils 4 and 5. The potentiometer may be calibrated to read electrode wire feed speed in inches per minute, and may be called a dial.

Yet a further adjustment is provided in the motor speed for the electrode wire feed by means of a fourth control coil 29 that likewise is connected between the power supply leads 19 and 18. Such control coil in this embodiment of the invention has 300 turns in it and was connected to oppose the output of the reactor coils 4 and 5 so that by adjustment of a resistance 30 (of 2000 ohms) connected in series with this control coil any variations in the values of members forming the circuit can be controlled and the desired operating range for the speed setting as determined by the potentiometer 28 and its calibration can be initially set in the apparatus.

Any other desired conventional components can be provided in the control 1 of the invention, and means may be provided for short circuiting the motor armature circuit, as by the switches 14 and 15 and associated means so that a dynamic braking action can be obtained when feed of the electrode is terminated. Any other conventional controls and members can be associated with the control system of the apparatus for supply of gas, cooling water, etc., in the weld circuit. A control switch 31 is positioned on the weld handle to operate the relay W and provide a controllable weld action.

It will be realized that the control 1 of the invention is independent of the actual weld current or weld voltage, which can be supplied to the electrode wire by any known means in a conventional manner.

The graph data shown in FIG. 2 shows how the motor speed indicated by the broken lines a—a, b—b, etc., appearing thereon will remain substantially constant over a relatively wide resistance to feed of the electrode wire through an electrode cable and nozzle or similar member. Typical curves of the force required in welding action to push .030 inch steel wire, 1/16 inch aluminum wire 43S, and 1/8 inch flux-cord wire are shown at A, B and C in the graph, respectively, and with the welding current used at the various weld electrode feed speeds being also indicated on the drawing.

The potentiometer 28 will provide a speed range for the electrode feed motor of from about 400 to 10,000 r.p.m. and the electrode feed can thus vary from about 50 to 800 inches per minute when standard gears are used in the motor drive circuit.

Typical operating conditions under various speeds and loads for the control are as follows:

|  | Low Speed | | Medium Speed | | High Speed | |
| --- | --- | --- | --- | --- | --- | --- |
|  | Low Load | High Load | Low Load | High Load | Low Load | High Load |
| Dial 28 Set | 150 | 150 | 500 | 500 | 900 | 900 |
| Armature Volts (v.) | 10 | 14 | 35 | 38 | 80 | 82 |
| Wire Feed Speed (i.p.m.) | 85 | 81 | 336 | 343 | 746 | 734 |
| Wire Push (lb.) | 10 | 56 | 10 | 56 | 10 | 56 |
| Armature Current (Amp.) | .6 | 2.0 | .8 | 2.2 | .8 | 2.4 |
| Coil 26 Amp. Turns | +19.50 | +19.50 | +24.00 | +24.00 | +29.40 | +29.40 |
| Coil 29 Amp. Turns | −24.00 | −24.00 | −24.00 | −24.00 | −24.00 | −24.00 |
| Coil 22 Amp. Turns | +.31 | +2.16 | +.48 | +2.16 | +.72 | +2.16 |
| Coil 24 Amp. Turns | −.54 | −.72 | −3.24 | −3.24 | −6.85 | −7.20 |
| Total Control Amp. Turns | −4.73 | −3.06 | −2.76 | −1.08 | −.73 | +.36 |

From this data it will be seen that increasing the motor speed dial setting results in a reduction in total control ampere turns and an increase in motor armature volts. Also an increase in load at a given speed dial setting reduces the total ampere turns of control current and raises the motor armature voltage.

From the foregoing, it is believed that a rugged, uncomplicated control has been provided to feed an electrode wire at a constant rate even under varying loads. Hence the objects of the invention are believed to be achieved.

While one complete embodiment of the invention has been disclosed herein, it will be appreciated that modification of this particular embodiment of the invention may be resorted to without departing from the scope of the invention as defined in the appended claims.

What is claimed is:

1. A control for feeding electrode wires independently of the weld current or voltage in automatic and semi-automatic arc welding apparatus and comprising
    a pair of leads providing an A.C. power source,
    an electric drive motor for the electrode wire operatively connected thereto to drive the electrode wire to the weld area at a steady rate regardless of the resistance to movement of the electrode wire,
    a magnetic amplifier reactor having a pair of main coils connected to the same power lead and having several auxiliary coils,
    a pair of rectifier diodes connected individually to the other of said leads,
    circuit means connecting each one of said main coils and different ones of said diodes together through said motor armature to form a motor armature D.C. power circuit,
    said circuit means including a low value resistance connected in parallel with a series connected choke coil and one of said auxiliary coils wound to increase the reactor output with increased armature current, said choke coil functioning to smooth out current flow through said one auxiliary coil, and
    a relatively high value resistance connected in series with a second of said auxiliary coils which is reversely wound with relation to said main coils and connected to the output of said main coils in parallel with said motor armature so that a drop in voltage thereacross will increase said reactor output, and a relatively high value resistance connected in parallel with the armature of said drive motor but in series with a second of said auxiliary coils which is reversely wound with relation to said main coils to decrease the voltage output of said main coils upon increased current through said second auxiliary coil.

2. In an electric arc-welding system including an electrode wire, a control cable having a bore through which said electrode wire passes to a weld point, a pair of feed rolls engaging said electrode wire, and a D.C. electric drive motor for said feed rolls operatively connected thereto to drive the electrode wire to the weld area at a steady rate regardless of the resistance to movement of the electrode wire through said control cable, and a drive motor control comprising
    a magnetic amplifier having a pair of main coils and auxiliary control coils,
    a pair of rectifiers,
    an A.C. power source connected to said magnetic amplifier,
    circuit means connecting said D.C. drive motor to said magnetic amplifier through said rectifiers,
    said circuit means including a low value resistance connected in the armature circuit of said drive motor in parallel with a series connected choke coil and with one of said auxiliary coils which is wound to increase the amplifier volts output with increased current through said one auxiliary coil, and
    a relatively high value resistance connected in series with a second of said auxiliary coils which is reversely wound with relation to said main coils to decrease the voltage output of said main coils, said second auxiliary coil being connected to said magnetic amplifier through said rectifier so that a drop in voltage over said second auxiliary coil will increase said amplifier volts output.

3. In an electric arc-welding system including an electrode wire, a control cable having a bore through which said electrode wire passes to a weld point, a pair of feed rolls engaging said electrode wire, and a D.C. electric drive motor for said feed rolls operatively connected thereto to drive the electrode wire to the weld area at a steady rate regardless of the resistance to movement of the electrode wire through said control cable, and a drive motor control comprising
    a magnetic amplifier having a pair of main coils and auxiliary control coils,
    a pair of rectifiers,
    an A.C. power source connected to said magnetic amplifier,
    circuit means connecting said D.C. drive motor to said magnetic amplifier through said rectifiers, and
    said circuit means including a low value resistance connected in the armature circuit of said drive motor in parallel with a series connected choke coil and with one of said auxiliary coils which is wound to increase the amplifier volts output with increased current through said one auxiliary coil, and a relatively high value resistance connected in parallel with the armature of said drive motor but in series with a second of said auxiliary coils which is reversely wound with relation to said main coils to decrease the voltage output of said main coils upon increased current through said second auxiliary coil.

References Cited by the Examiner

UNITED STATES PATENTS

| 2,455,869 | 12/1948 | Krabbe | 323—89 X |
| 2,675,513 | 4/1954 | Malick | 318—347 |
| 2,735,060 | 2/1956 | Malick | 318—513 |
| 2,823,331 | 2/1958 | Bichsel et al. | 318—333 |
| 3,048,693 | 8/1962 | Adamson | 219—131 |

ORIS L. RADER, *Primary Examiner.*

JOHN F. COUCH, *Examiner.*